Sept. 14, 1926.

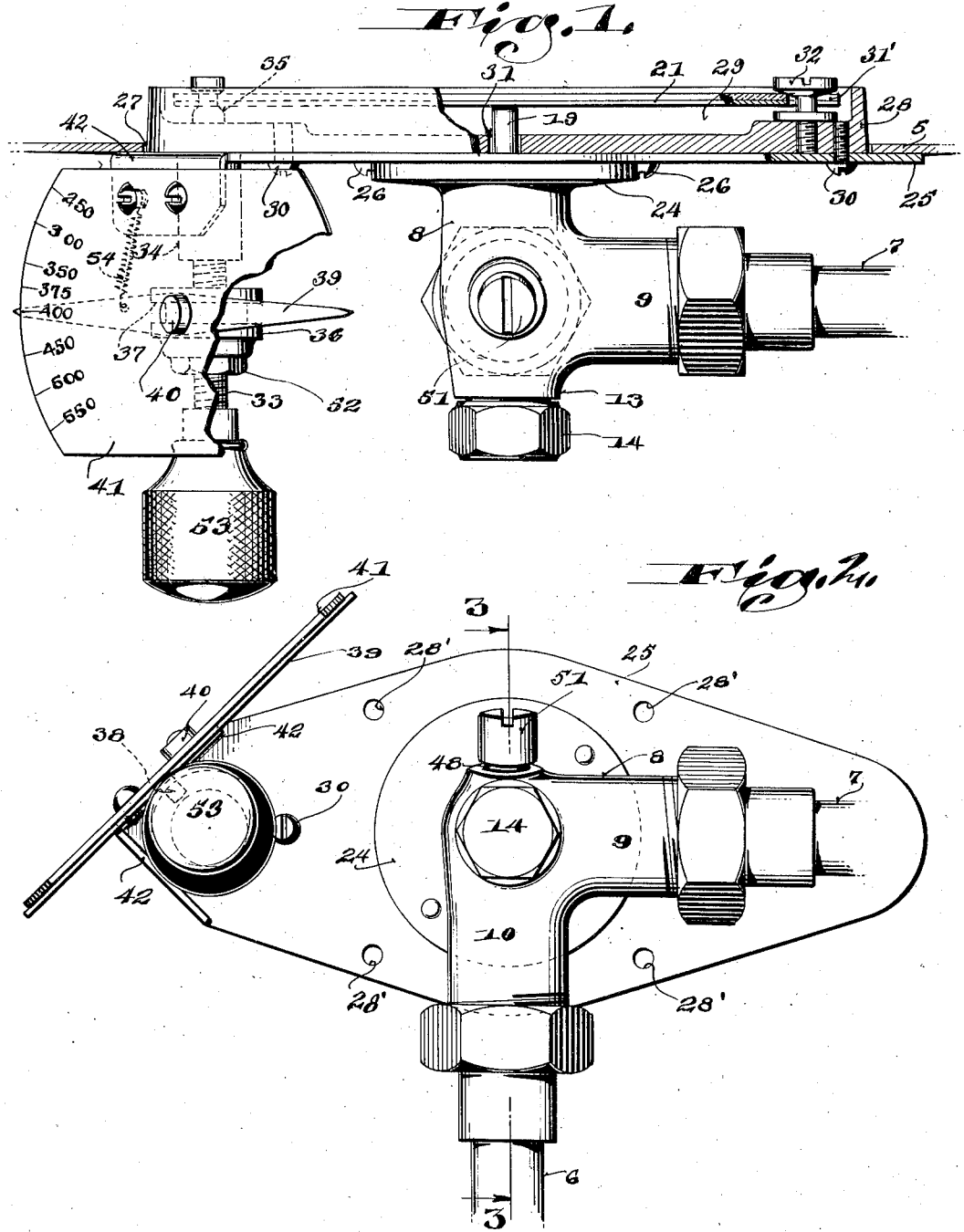

E. L. CLAUS ET AL 1,599,554

OVEN HEAT REGULATOR.

Filed Nov. 25, 1921

INVENTORS.
Emil L. Claus
Walter E. Claus
BY

Ira M. Jones,
ATTORNEY.

Sept. 14, 1926.
E. L. CLAUS ET AL
1,599,554
OVEN HEAT REGULATOR
Filed Nov. 25, 1921  3 Sheets-Sheet 3
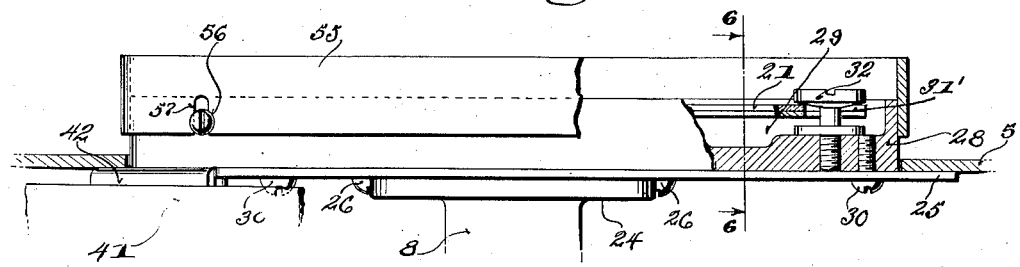
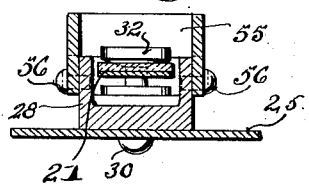
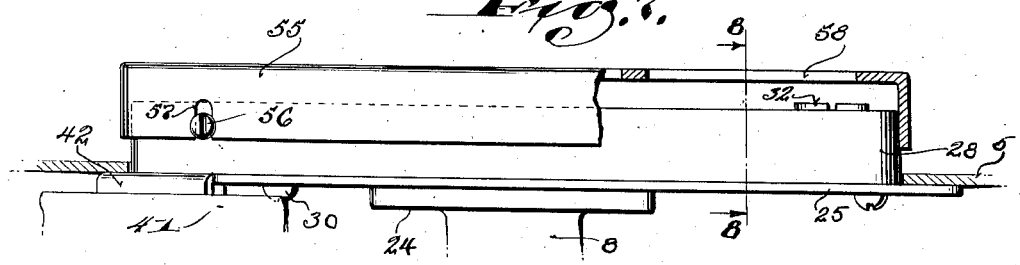
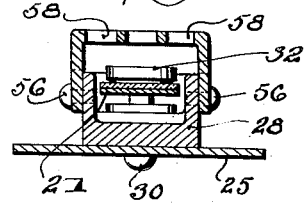
INVENTORS,
Emil L. Claus
Walter E. Claus
BY
Ira M. Jones
ATTORNEY.

Patented Sept. 14, 1926.

1,599,554

UNITED STATES PATENT OFFICE.

EMIL L. CLAUS AND WALTER E. CLAUS, OF MILWAUKEE, WISCONSIN, ASSIGNORS, BY DIRECT AND MESNE ASSIGNMENTS, TO MILWAUKEE GAS SPECIALTY COMPANY, OF MILWAUKEE, WISCONSIN, A CORPORATION OF WISCONSIN.

OVEN-HEAT REGULATOR.

Application filed November 25, 1921. Serial No. 517,823.

This invention relates to certain new and useful improvements in oven heat controlling devices and has for one of its objects to provide a unitary structure capable of ready application to ovens now in use, or to ovens at the time of their manufacture.

One fault common to the type of oven heat controlling device now in general use is that the thermostatic member is more or less directly influenced by the oven heater, resulting in an overworking thereof. It is, therefore, an object of this invention to provide baffle means encompassing the thermostatic member to protect the same from sudden temporary changes in the temperature of the oven to thus eliminate overworking of the heater controlling means, the baffle means also serving to reinforce the thermostatic member support and prevent its buckling or distortion under temperature changes and thus insure accurate operation.

Another object of this invention is to provide a device of the character described in which the thermostatic member is mounted within a channeled or recessed baffle member adapted to permit restricted circulation to the oven gases about the thermostatic member.

Another object of this invention is to provide a thermostatic member one end of which is engaged with an adjustable spindle or post and the other end with a readily removable spool member or post, whereby the thermostatic member may be removed by the detachment of the spool member.

Another object of this invention is to provide a device of the class described in which the thermostatic member has no fixed connection with the heater controlling member or device whereby the necessity of providing an opening therein, and consequently weakening the structure, is eliminated, the thermostatic member being preferably so arranged that spring means urge the heater controlling member or valve toward closed position when the temperature of the fluid surrounding the thermostatic member permits and the thermostatic member will move the valve member toward open position against the action of its spring when the temperature of the oven so permits.

A further object of this invention is to provide an improved form of valve construction for use in oven heat regulating devices in which the valve is closed by a spring and opened by a thermostatic member working against the spring, the valve spring also serving to keep the parts under tension at all times with the slack to one side.

A further object of this invention is to provide a valve construction for an oven heat regulating device in which the valve stem has a loose connection with the valve proper whereby even seating of the valve is obtained.

A further object of this invention is to provide an improved form of bypass control for an oven heat control regulating device valve whereby the volume of fluid passing through the casing by means of a bypass may be definitely regulated and the possibility of clogging of the bypass eliminated.

A still further object of this invention is to provide an oven heat control device having a setting dial so mounted as to permit its positioning at any angle without, in any manner, destroying its connection with temperature adjusting member.

A still further object of this invention is to provide a thermostatic control for a heating oven in which the operating bar has a decided movement under temperature changes whereby a comparatively small valve port opening may be employed to thus eliminate congestion and obtain the full velocity of the gas and permit the use of a small valve structure.

Still a further object of this invention is to provide an adjustable baffle member for the thermostatic element whereby the circulation of gases around the thermostatic element may be controlled.

And a still further object of this invention is to provide means for maintaining all slack to one side whereby accurate calibration is assured.

With the above and other objects in view which will appear as the description proceeds, our invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, we have illustrated one complete example of the physical embodiment of our invention, and several modifications thereof, constructed according to the best mode we have so far devised for the practical application of the principles thereof, and in which:—

Figure 1 is a horizontal sectional view taken through the outer wall of an oven equipped with an oven heat controlling device embodying this invention, parts of the device being broken away and in section to more clearly illustrate details of construction;

Figure 2 is a view in side elevation of our improved device;

Figure 5 is a fragmentary view, partly in section and partly in elevation, illustrating one form of adjustable baffle member;

Figure 6 is a sectional view taken transversely through Figure 5 on the line 6—6;

Figure 7 is a view similar to Figure 5 of a slightly modified form of adjustable baffle, and Figure 8 is a transverse sectional view taken on the line 8—8 of Figure 7.

Figure 3:
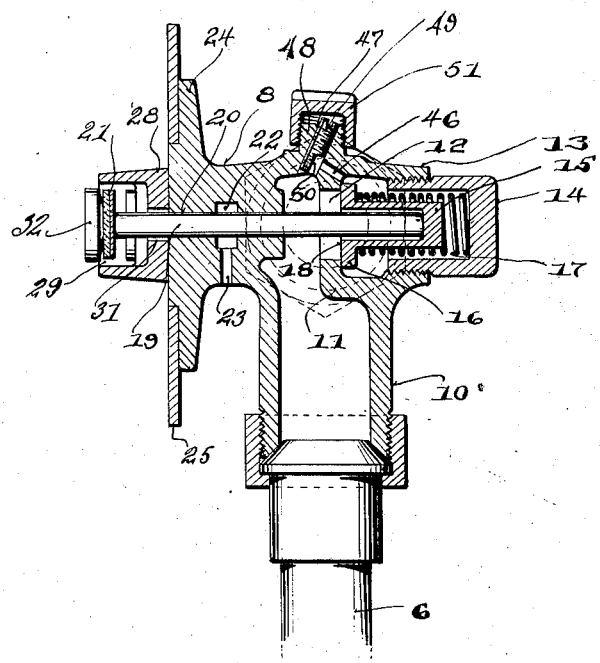
Figure 3 is a view taken tranversely through our improved device on the plane of line 3—3 of Figure 2.

Referring now more particularly to the accompanying drawings, in which like numerals designate like parts throughout the several views; numeral 5 designates the wall of a range, stove or the like heating oven, the burner or heater of which (not shown) is supplied with fuel by a pipe 6. Pipe 6 is connected with a source of fuel supply through our improved control device and a main supply 7, in which is preferably positioned a suitable shut off valve or cock (not shown).

The control device consists of a valve casing or body 8 provided with an inlet 9 and an outlet 10 with which pipes 7 and 6 are coupled, respectively. The valve casing inlet and outlet are separated by a partition 11 having a fuel passageway or port 12 therein and the rear wall of the casing is provided with a recessed projection 13 concentric with port 12 and receiving a counterbored cap 14. Having its shank or projection 15 mounted within the recess of cap 14, is a valve member 16 which is normally urged to engagement with its seat, formed by that part of partition 11 surrounding port 12, by a spring 17 coiled therearound and having its ends abutting valve 16 and the closed end of cap 14.

The valve projection or shank is counterbored, as at 18, to receive the inner end of a stem or plunger 19 which passes outwardly from the valve casing through a bore 20, concentric with port 12, the outer end of stem 19 pressing against the inner face of a thermostatic member 21, to be later described. In order to insure the full even seating of valve 16, the diameter of stem 19 is less than that of bore 18 to permit movement of the valve independent of the stem. Stem 19 has a close or sliding fit in bore 20 to reduce to a minimum leakage from the valve around the stem, and in order to positively prevent the escapage of gas past stem 19, an intermediate pocket or recess 22 communicates with bore 20 into which all leakage expands, the pocket being connected with the atmosphere or any other depository by a passage 23.

The inner side of body 8 is flanged, as at 24, to provide means of attachment to a plate or support 25 which is securable to the oven wall by fastenings 26. In attaching the device, the oven wall is longitudinally slotted, at as 27, to receive a baffle member 28 and apertured in alignment with openings 28′ in the plate to receive fastenings 26. Baffle member 28 is secured to plate 25 by fastenings 30 and has its inner face longitudinally recessed or channeled, as at 29, to receive the thermostatic member 21, the intermediate portion of said baffle member being apertured, as at 31, in alignment with bore 20, to permit the passage therethrough of stem 19.

Thermostatic member 21 is preferably in the form of a bi-metallic strip, the metals of which have different coefficients of expansion, and said strip is provided with slots or recesses 31′ at each end to receive suitable securing means. One of said securing means is in the form of a removable screw or spool member 32 and the other a post or spindle 33 threaded in a boss or projection 34 carried by the adjacent end of the baffle member and having its inner end reduced, at as 35, to receive the recess 31′ in the adjacent end of member 21.

Figure 4:
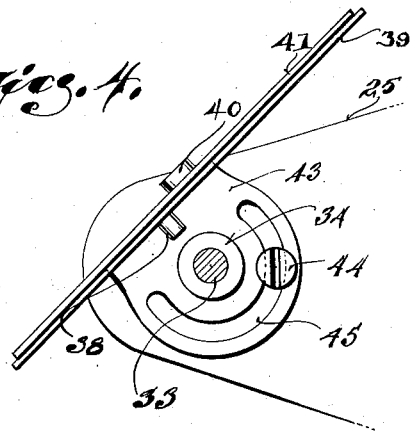
Figure 4 is a detail fragmentary view illustrating a slightly modified manner of mounting the setting dial, the adjusting spindle or post being illustrated as in section at a point inwardly of the indicator actuating collar.

Adjustably mounted on spindle 33, exteriorly of plate 25, is an indicator actuating collar 36 which is peripherally channeled or grooved as at 37 to receive a pin 38 carried by an indicator 39 pivotally secured, as at 40, to an indicating setting dial 41. The dial 41 is capable of adjustment as to its angular position with respect to the horizontal by means of two attaching flanges 42 or by the construction illustrated in Figure 4. In Figure 4, the dial 41 is mounted on a plate 43 which is rotatably secured about projection 34 and held in any position of adjustment by a set screw 44 carried by plate 25 and passing through an arcuate slot 45 in plate 43. With this construction dial 41 may be set at any position of adjustment without disturbing the connection of the indicator with collar 35 by reason of the dial being adjusted about the axis of spindle 33 and incidentally the axis of collar 36.

Strip 21, as illustrated in Figures 1 and 3, is completely concealed within the channel of baffle member 28 and the ends and sides of said strip are slightly spaced from the adjacent wall of the baffle member to insure circulation about the thermostatic strip. With this construction, it will be readily obvious that the circulation of the heated oven gases about strip 21 is restricted so that overworking of the heater control member is eliminated and at the same time sufficient circulation about the strip is provided for the positive operation of the same. The baffle member also provides a firm support or base for the thermostatic strip which is so constructed as to prevent buckling or distortion thereof under temperature changes to thus insure accuracy of the device. The thermostatic strip is of less thickness than the width of the channel or groove of the spool 32 or the reduced part 35 of the spindle 33 in order to accommodate for expansion under the influence of heat and by reason of spring 17 at all times urging pin 19 against the strip the slack thus permitted is retained to one side at all times in order to insure accurate calibration and thus eliminate variance between the temperature maintained within the oven and that at which the indicator 39 is set.

With this construction, the side of strip 21 formed of the metal having the lesser coefficient of expansion is positioned nearest the oven wall so that the medial portion of said member will be bowed away from the wall in proportion to the temperature of the oven and the valve consequently moves toward closed position under action of its spring. As the oven cools the thermostatic strip tends to straighten and resume its normal shape moving with it the valve or controlling member against the action of its spring to decrease the volume of gas flowing therepast.

In order to insure the maintenance of a flame at the burners (not shown) irrespective of the position of valve 16, a bypass is necessary which in the present form is illustrated as a passage 46 leading from the intake side of partition 11 to a threaded opening 47 arranged at an angle thereto and communicating with the outlet side of the partition, said opening extending through an exteriorly threaded boss or projection 48 formed on the valve casing.

A set screw or adjusting member 49 is positioned within opening 47 and has its inner end reduced or cut away to one side, as at 50, to permit flow of fluid from passage 46 into the outlet side of the valve casing, the volume of this flow being adjusted by rotation of screw 49 to cause its reduced portion 50 to either increase or decrease the area of the passageway. This construction eliminates clogging of the device and insures a valve action in the bypass such as not obtained by the use of a screw member having its inner end tapered. To prevent tampering with setting of screw 49, and for the purpose of appearance, a removable cap 51 covers boss 48.

Our improved device is capable of application to any type of oven, necessitating but the cutting of the elongated opening 27 in the side wall thereof and openings for the reception of fastening members 26, and after the same has been secured in position, a thermometer is preferably placed within the oven and the burner, or burners, lit. Should the oven temperature register 500 degrees, jam nut 52 of the indicator actuating collar 36 is loosened and the collar adjusted on spindle 33 to register pointer 39 with designation 500 on the setting dial, when nut 52 is turned to jam against collar 36 and make the same fast on the spindle. Fastening member 32 may also be utilized as one means of adjusting the device.

Should the operator wish to maintain a certain degree of temperature within the oven, the setting spindle 33 is rotated by means of its knob 53 until the indicator 39 registers with the desired degree. The higher the temperature at which it is desired to maintain the oven, the more spindle or post 33 is screwed outwardly of the oven to widen the distance between valve 16 and its seat.

When the heat of the oven passes beyond the degree at which the device has been set strip 21 will be bent or bowed sufficiently to permit movement of valve 16 toward closed position by spring 17 to shut off all or part of the supply of fuel, as a result of which the heat given off by the oven heater is reduced and upon the temperature falling below the set degree, the strip 21 will tend to straighten consequently widening the gap between the valve and its seat as will be readily obvious.

While spring 17 compensates for all slack between the strip 21 fastenings and the valve, there remains a certain degree of slack between the pin 38 and the walls of the collar groove 37, as a result of which the setting of the device is apt to be off several degrees either way. To eliminate the possibility of this inaccuracy, we provide a spring 54, see Figure 1, the ends of which are secured to indicator 39 and the dial support to maintain pin 38 in engagement with one wall of the groove 37 at all times.

As will be readily obvious, the excessive flexing or bowing of the strip 21 under temperature changes permits the use of a comparatively small valve port opening 12 thus obtaining the full velocity of the gas and permitting the use of a small valve structure.

As different makes of stoves require different adjustments of the device, one manner of obtaining this adjustment is by a sleeve 55 adjustably fitted over the baffle member and forming a continuation of the side walls thereof for regulating the circulation of the oven hot air therearound.

Sleeve 55 is secured in any position of adjustment by screws 56 engaging in elongated recesses 57 in sleeve 55, the adjustment being procured by loosening screws 56, moving the sleeve in or out, as the need may be, and then tightening the screws.

In Figures 7 and 8, the sleeve is illustrated in the form of a cover provided with openings 58 in the top thereof to permit the circulation of air through the baffle member.

What is claimed is:

1. In a thermocontrol device, a member sensitive to temperature changes, means securing said member whereby the same will flex when heated, means actuated by a flexing of said member to operate a heater controlling device, and a baffle member protecting said member to restrict the circulation of gases thereabout.

2. In a thermocontrol device, a member sensitive to temperature change, means securing said member whereby the same will flex when heated, means actuated by a flexing of said member to operate a heater controlling device, and a baffle member protecting said member to restrict circulation of gases thereabout, said baffle forming a reinforcing means to prevent distortion of the member securing means whereby accurate operation of the device is assured.

3. In a thermocontrol device, a member sensitive to temperature changes, means securing said member whereby the same will flex when heated, means actuated by a flexing of said member to operate a heater controlling device, and a baffle member surrounding said first named member, the outer face of said temperature sensitive member being exposed at all times and the sides thereof being spaced from the sides of the baffle member to permit circulation of air around the temperature sensitive member.

4. In a thermocontrol device, a member sensitive to temperature changes, means securing said member whereby the same will flex when heated, means actuated by a flexing of said member to operate a heater controlling device, and a rigid, open faced channeled baffle member receiving said first named member, said temperature sensitive member having its sides and ends spaced from the side and end walls forming the channel of said baffle member to permit circulation of air therearound.

5. In a thermocontrol device, a support, a member sensitive to temperature changes, means positioned at each end of the temperature sensitive member to secure the same to said support, one of said means being movable longitudinally to adjust the temperature change sensitive member and the other being in the form of a readily detachable member, and means actuated by said temperature sensitive member to control a heater.

6. In a thermocontrol device, a support, a member sensitive to temperature changes, means positioned at each end of the temperature sensitive member to secure the same to said support, one of said means being in the form of a detachable and adjustable member, and means actuated by said temperature sensitive member to control a heater.

7. In a thermocontrol device, a support, a member sensitive to temperature changes, means positioned at each end of the temperature sensitive member to secure the same to said support, one of said means being in the form of a readily detachable spool member.

8. In a thermocontrol device, a member sensitive to temperature changes, a support, a substantially fixed post securing one end of said member to said support, a longitudinally adjustable post securing the other end of said member to said support whereby said member will bow when subjected to heat, and a control member for a heater actuated by said temperature sensitive member, said substantially rigid post being detachable from said support to permit the ready removal of said temperature sensitive member.

9. In a thermocontrol device, a member sensitive to temperature changes, means securing said member whereby the same will flex when heated, means actuated by a flexing of said member to operate a heater controlling means, and an adjustable baffle member for regulating the circulation of gases about said temperature change sensitive member.

10. In a thermocontrol device, a baffle member provided with an elongated recess, a member sensitive to temperature changes, means securing said temperature sensitive member within the baffle member recess whereby the same will flex when subjected to temperature changes, means actuated by a flexing of said temperature sensitive member to operate a heater controlling means, and adjustable sides for said baffle member whereby the circulation of fluid about said temperature sensitive member may be regulated.

11. In a device of the character described, an oven, an elongated channeled member secured within the oven and having its outer face open to the interior of the oven throughout the entire length of said member, a temperature change sensitive member positioned within the channel of the elongated member with its outer face near the outer face of the elongated member whereby the temperature change sensitive member will bow when heated, a heater control member for the oven actuated by the temperature change sensitive member, and a member adjustable over the elongated member to vary the depth thereof.

In testimony that we claim the foregoing we have hereunto set our hands at Milwaukee, in the county of Milwaukee and State of Wisconsin.

EMIL L. CLAUS.
WALTER E. CLAUS.